April 22, 1958 B. ROSSI ET AL 2,831,929

MAGNETIC AMPLIFIER

Filed June 27, 1946 3 Sheets-Sheet 1

INVENTORS
BRUNO ROSSI
ROBERT T. BEYER
HENRI S. SACK
GLENN H. MILLER

BY M. A. Hayes

ATTORNEY

INVENTORS
BRUNO ROSSI
ROBERT T. BEYER
HENRI S. SACK
GLENN H. MILLER
BY
M. O. Hayes
ATTORNEY April 22, 1958 B. ROSSI ET AL 2,831,929

MAGNETIC AMPLIFIER

Filed June 27, 1946

3 Sheets-Sheet 3

INVENTORS
BRUNO ROSSI
ROBERT T. BEYER
HENRI S. SACK
GLENN H. MILLER

BY M. A. Hayes
ATTORNEY

United States Patent Office 2,831,929

Patented Apr. 22, 1958

2,831,929

MAGNETIC AMPLIFIER

Bruno Rossi, Winchester, Mass., Henri S. Sack, Ithaca, N. Y., Robert T. Beyer, Providence, R. I., and Glenn H. Miller, Rochester, N. Y., assignors to the United States of America as represented by the Secretary of the Navy Application June 27, 1946, Serial No. 679,596

6 Claims. (Cl. 179—171)

This invention relates to magnetic amplifiers and more particularly to an improved magnetic amplifier for use in computer circuits.

The basis of a magnetic amplifier circuit is formed by a non-linear transformer, that is, a transformer having a core of ferromagnetic material and being operated in a non-linear region, usually near saturation for greatest sensitivity and stability. For best operation the transformer should have a core of ferromagnetic material presenting a hysteresis loop with a very steep slope. As is well known to the art, the non-linear relations existing between flux and magnetizing force in ferromagnetic cores results in the production of harmonics when a sine wave magnetizing force is applied to a coil wound on the core. With pure sine-wave excitation of the primary of a transformer, the distortion components are in the form of odd harmonics, of which the third is most important. This is true for any magnitude of the input potential as long as the hysteresis loop is symmetrical with respect to the origin of the axes. If, however, this symmetry is disturbed by superimposing a D. C. magnetic field and thus displacing the hysteresis loop parallel to itself, then even harmonics will appear on the output side, the amplitude depending upon the core material and the direct and alternating magnetizing forces involved. As a first approximation, the intensity of the resulting second harmonic is proportional to the superimposed direct current magnetic field, or D. C. bias as it is sometimes called. This D. C. bias need not be applied through the coil in which the alternating magnetic force is applied, but may be produced by passing current through a separate coil wound on the transformer, the amplitude of each of the even harmonics in the output being proportional to the D. C. bias current. By proper combination and winding of two transformers, it is possible to separate the second harmonic from the fundamental and use the second harmonic after amplification as a measure of the bias current. One disadvantage of this arrangement is that the range of linearity between the amplitude of the second harmonic and the bias current is limited by the characteristics of the transformer and also depends upon external conditions such as temperature and vibrations. A second disadvantage is the instability of a straightforward amplifier where precision is desired.

Accordingly, it is an object of this invention to overcome these disadvantages of a magnetic amplifier.

It is further an object to provide a magnetic amplifier having negative feedback.

It is another object of this invention to provide a magnetic amplifier which does not require linear relations in the component transformers.

A still further object is to provide a magnetic amplifier which does not require high stability of the amplifying system.

These and other objects will become apparent from the specification when taken with the accompanying drawings in which.

Figure 1:
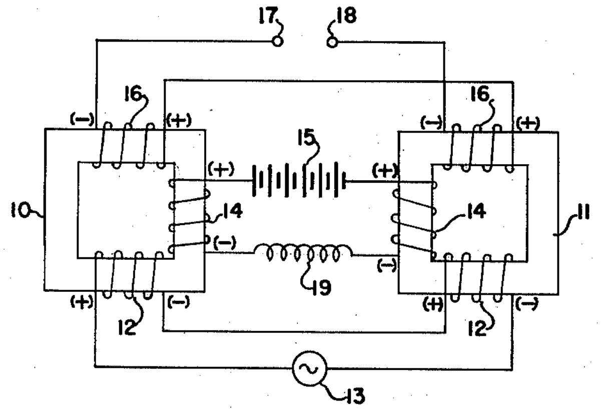
Fig. 1 is a schematic diagram of two transformers connected to illustrate the basic principles of this invention.

The basic circuit upon which this invention was developed is shown in Fig. 1. It consists of two identical ferromagnetic cores 10 and 11, primary windings 12 energized by a source of audio frequency voltage 13, direct current windings 14, a source of D. C. voltage 15, and secondary coils 16. A constant amplitude and frequency alternating voltage is applied to primary windings 12, and a D. C. voltage is applied to coils 14. As previously mentioned, with the presence of both alternating and direct voltage excitation, the second harmonic of the applied alternating voltage appears at the secondary of each transformer. With the transformers wound and connected as shown, the fundamental cancels out across secondary winding 16, whereas the second harmonic will add up in the two transformers. The amplitude of the output of the secondary windings at terminals 17 and 18 is thus a measure of the direct current flowing in windings 14. Choke coil 19 is inserted as shown to prevent the flow of alternating current in the D. C. coils. It is apparent that instead of the fixed source of D. C. voltage, a slowly varying direct current could be passed through the D. C. coils, with an amplified measure of the current resulting in the output windings. The circuit described above is unadaptable to precision work due to the disadvantages mentioned above, namely limited linearity between the intensity of the second harmonic and bias current, and instability of the amplifying system.

The present invention employs a system of negative feedback to overcome the disadvantages of the basic circuit. The transformers of Fig. 1 are provided with another set of windings similar to the D. C. or secondary windings. The second harmonic appearing on secondary windings 16 is amplified and transformed into a direct current which is fed into the newly added feedback winding in such a way that it opposes the effect of the bias current. If the amplification is sufficiently high, the compensation current will then be proportional to the bias current with a very high degree of accuracy. Calling $I_1$ the bias current; $I_c$ the compensating current: $k$ the over-all amplification of the system, defined as the ratio of the output current of the amplifier system to the bias current if the compensating coils are not connected; and the number of turns on the bias windings $N_1$ and that on the compensating windings $N_c$, then the following relation holds:

$$I_c=\frac{I_1}{\frac{1}{k}+\frac{N_c}{N_1}}$$

from which it is seen that if $k$ is very large, $I_c$ will be substantially equal to $$I_1\left(\frac{N_1}{N_c}\right)$$

It is evident that such a system does not require any linear relations in the transformer or very high stability of the amplifying system.

Figure 2:
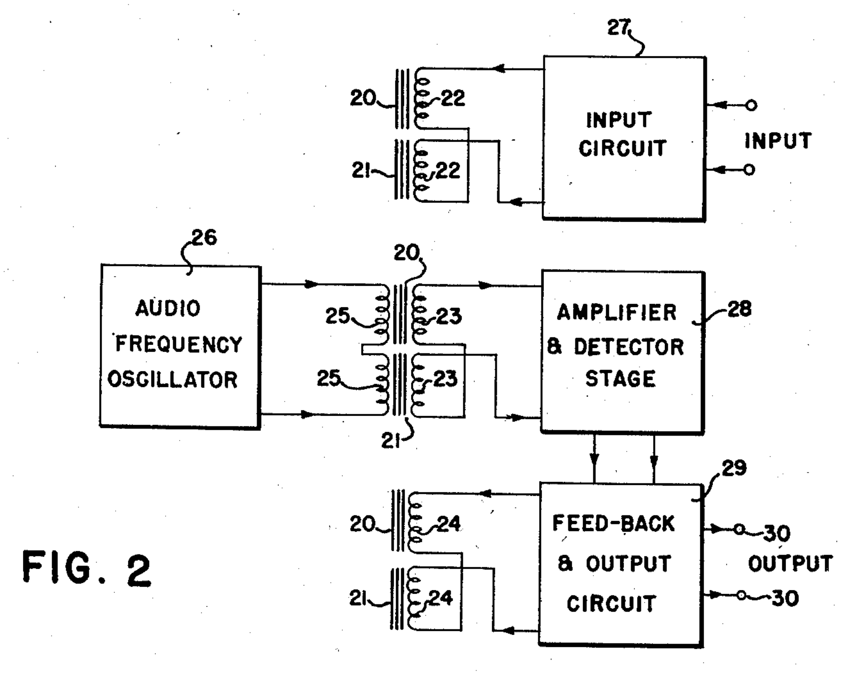
Fig. 2 is a block diagram showing the interrelation of components of one embodiment of the invention.

A practical circuit making use of the feedback principle is described by use of the block diagram in Fig. 2. Two separate non-linear transformers 20 and 21 include bias or input windings 22, tertiary windings 23, and feedback windings 24, besides the primary excitation windings 25, which are excited by audio frequency oscillator 26. The input current goes through input circuit 27 into winding 22, and windings 23 are connected to an amplifier and detector stage 28 where the second harmonic is amplified and rectified. The D. C. output of amplifier and detector stage 28 is then fed back to windings 24 through feedback circuit 29, which may be a type of D. C. amplifier. The output at terminals 30 is an amplified measure of the input current in windings 22. The components mentioned in connection with the block diagram of Fig. 2 will be subsequently described in more detail.

The non-linear transformers used in this circuit are of the toroidal or ring type, any pair of which are to be used together being accurately matched to each other. The cores must have identical properties and of course the windings of the two transformers must be symmetrical. When the circuit is to be used with very small currents the transformers must be shielded against the earth's magnetic field. It is also advisable to shock mount the transformers to prevent any variation in the magnetic properties of the core material due to vibration.

The requirements of the audio frequency oscillator which excites the transformers are that it must have a nearly pure sine wave output, with, in particular, a very low second harmonic content, and must have an output potential sufficiently high to drive the transformers into the saturation region of their magnetization curves. A very satisfactory oscillator for this purpose is a balanced negative resistance oscillator of the type shown in Fig. 3. In addition to providing a nearly pure sine wave output, it has an additional feature of providing a second harmonic signal at the common cathode, this signal being taken from terminal 31 and used as a modulating signal in the detector part of the circuit, as will be explained hereinafter. The tank circuit of the oscillator consists of condenser 32 and coil 33, which is the primary winding of a high Q transformer. The secondary of this transformer is connected to the primaries of the non-linear transformers, thus combining the tank coil and the matching transformer in a single unit. Oscillator constants were chosen to give a frequency of approximately 1000 cycles per second.

Figure 3:
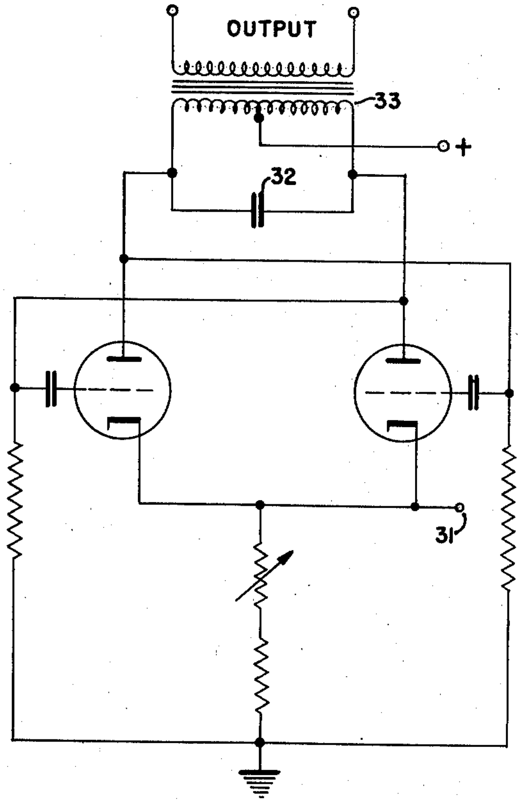
Fig. 3 is a circuit diagram of an audio frequency oscillator that is a necessary component of this invention.
Figure 4:
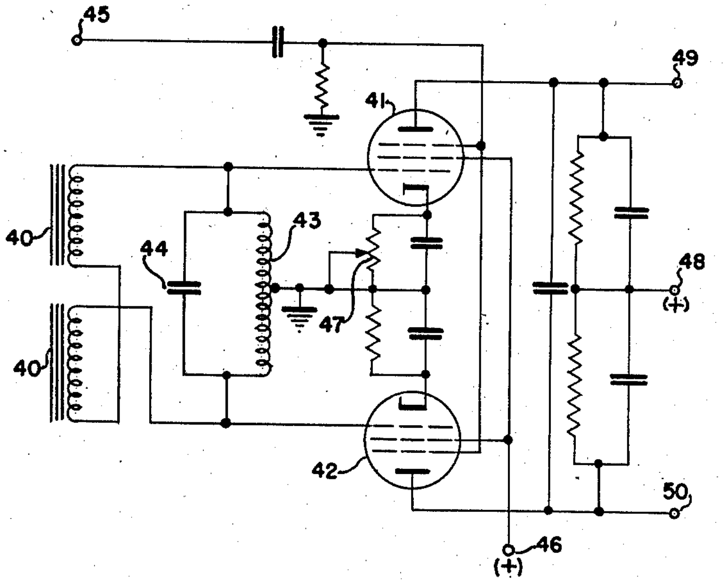
Fig. 4 is a circuit diagram of a phase-sensitive detector which is a necessary component of the invention.

To measure the second harmonics present in the secondary winding due to the small magnetic field created by the difference between the input and compensating current, this voltage must be detected and transformed into the compensating current. If all the possible input currents would never change their sign during operation, a straightforward detection of the second harmonic would be sufficient. However, such an arrangement is extremely unstable as can be seen by the following reasoning. Under normal operating conditions, the bias current is slightly larger than the compensating current, giving rise to a net magnetic field, the deviation of which is determined by the direction of the bias current. This magnetic field produces the second harmonic signal, which, in turn, after being amplified and rectified, gives the compensating current. If now, the bias current increases, then this net field increases, too, resulting therefore in an increase in compensation current. Also if the bias current decreases, the field and compensating current decreases. This latter behavior, however, will occur only if the bias current does not change too quickly. If the bias current suddenly drops far below the compensation current, should the time constant of the apparatus be such that the compensation current cannot follow sufficiently rapidly this change, then for a short period the compensation current will be larger than the bias current, resulting in a net magnetic field in the opposite direction. If the absolute magnitude of this field is larger than that of the field just before the bias current changed, then the compensation current will increase further because the detection does not take into account the direction of the field but only its magnitude. Since the effect is cumulative, the compensation current will increase beyond limit, and the apparatus fail to function properly. To avoid this malfunction, it is necessary to detect with a phase-sensitive device, such that if the net magnetic field changes its direction so the output signal changes its phase by 180 degrees, the rectified potential and therefore the compensation current also change their signs. It is also apparent that in the case of positive and negative input currents, some method must be introduced to take into account this phase difference. For these reasons a phase-sensitive detector of the type illustrated in Fig. 4 is used. The second harmonic is induced in the two secondary windings 40 of the two non-linear transformers, and is applied to the control grids of pentodes 41 and 42. It is apparent that with the tank coil consisting of inductance 43 and condenser 44 tuned to the second harmonic frequency, the signal applied to tube 41 will be 180° out of phase with that applied to the grid of tube 42. A modulating signal, which is the second harmonic of the audio frequency oscillator taken from terminal 31 of Fig. 3 is applied to the suppressor grids of pentodes 41 and 42 through terminal 45. The circuit is so arranged that this modulating signal is always either in phase or 180° out of phase with the second harmonic signal reaching the control grids of tubes 41 and 42. The screen grids of pentodes 41 and 42 are connected to a source of positive potential at terminal 46, and potentiometer 47 in the cathode circuit serves to balance the two pentodes. The plate supply voltage is applied to terminal 48, and the output is taken from terminals 49 and 50. The modulating signal serves to key the two pentodes in such a way that a differential D. C. output results so that terminal 49 will be positive with respect to terminal 50, or vice versa, depending upon the phase of the input signal with respect to the modulating signal.

The differential output of the detector must be transformed into a current which can be fed back into the compensating coils of the non-linear transformers. This can be done in many different ways, one of which is shown in the complete circuit of the magnetic amplifier of Fig. 5. The output signals taken from the plates of detector pentodes 60 and 61 are applied to the grids of a differential cathode follower consisting of triodes 62 and 63, whose cathodes are connected by a resistance 64, the center tap of which is connected to a source of negative voltage at terminal 65. The differential voltage appearing across resistor 64 causes a current flow through the compensating windings 66 of non-linear transformer 67.

Figure 5:
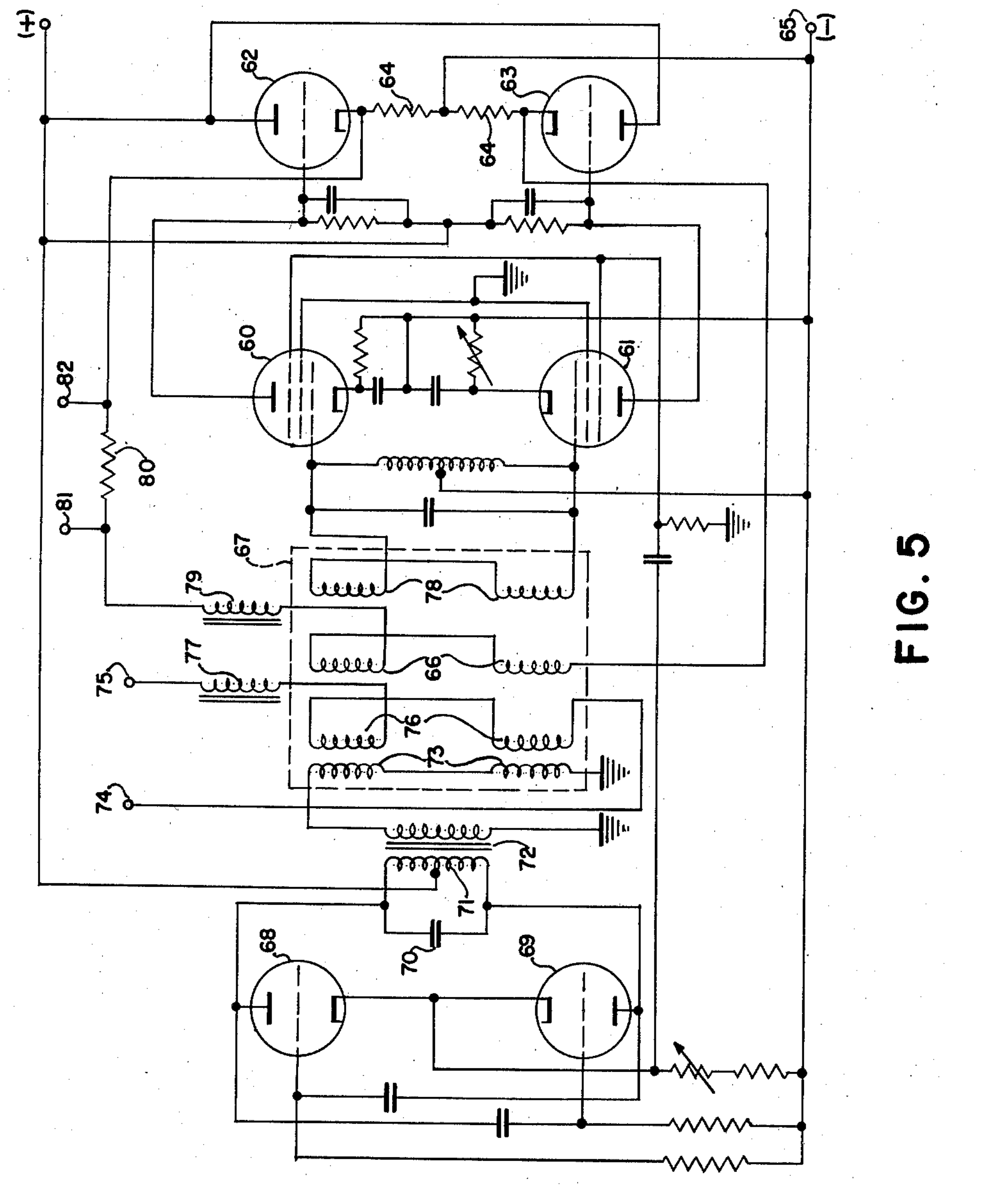
Fig. 5 is a circuit diagram of the complete magnetic amplifier.

The following discussion is a review of the operation of the complete circuit as shown in Fig. 5. An audio frequency signal of approximately 1000 cycles per second is generated by the oscillator comprising essentially triodes 68 and 69, and a tuned tank circuit composed of condenser 70 and inductance 71, which is one winding of a high Q matching transformer 72. The signal is magnetically coupled to the secondary of transformer 72 and thence to primary winding 73 of non-linear transformer 67. A second harmonic signal is taken from the common cathode circuit of the oscillator triodes and applied to the suppressor grids of detector pentodes 60 and 61 to be used as a modulating signal. The input circuit connected to input terminals 74 and 75 comprises the two windings 76 of non-linear transformer 67, resulting in a very low input impedance. This is desirable since the magnetic amplifier is a current sensitive instrument. Since most of the applications of the amplifier involve circuits of slowly varying direct currents, the insertion of a large choke 77 in series with the input windings, prevents any A. C. from the circuit applied to terminals 74 and 75 from reaching coils 76. With the alternating electromotive force applied on windings 73 and the direct electromotive force applied to windings 76, a second harmonic of the oscillator frequency appears across tertiary windings 78 of non-linear transformer 67. This alternating voltage is rectified and amplified in the phase-sensitive detector comprising essentially pentodes 60 and 61, resulting in a differential D. C. signal being applied to the grids of the differential cathode follower comprising triodes 62 and 63. The voltage differential which results between the cathodes of triodes 62 and 63 causes a current to flow through compensating windings 66 of non-linear transformer 67. Choke coil 79 is inserted in series with the compensating windings to make the A. C. impedance in the feedback circuit sufficiently high, which improves in general the quality of performance.

There are several methods of taking an output from the circuit of Fig. 5, the application for which the output is to be used determining the method, but the simplest and most convenient way is to insert a resistor 80 in series with compensating windings 66 and use the voltage developed across resistor 80 as the output. The voltage across resistor 80 taken from terminals 81 and 82 is therefore proportional, with a high degree of precision, to the current passing through input windings 76. For example, it is possible to obtain a voltage output of several volts across resistor 80 proportional with a high degree of precision to a few microamperes of current flowing in the input windings. The proportionality or amplification factor of course depends on several factors, namely, turns ratios between windings of the transformer, the amplification of the detector, the magnitude of the supply voltage, and the size of circuit constants.

The foregoing discussion illustrates examples of components comprising the overall amplifier circuit. However, any oscillator that meets the requirements can be used. An oscillator of a frequency of 1000 C. P. S. was discussed in the foregoing description, but it is apparent that other audio frequencies might well be used. Similarly, the phase-sensitive detector and feedback circuit may take a variety of forms. It is apparent also, that the number of windings on the transformers need not necessarily be four, but can be reduced in number by using the same winding for an A.-C. and a D.-C. current (e. g. using the pick-up winding simultaneously as a feedback winding). Accordingly, the foregoing disclosure should not be construed as a definition of the invention but is merely illustrative of one form the invention may take.

What is claimed is:

1. A magnetic amplifier comprising in combination, a pair of magnetic cores, each core having mounted thereon a primary, secondary, bias and feedback winding, means for energizing said primary windings with an alternating current signal of a predetermined frequency and of an amplitude sufficient to saturate said cores during a portion of its cycle whereby complex waves are induced in said secondary windings, means for coupling a unidirectional signal of variable amplitude and reversible polarity to said bias windings whereby second harmonics of said alternating current signal appear in said complex waves, means for connecting said secondary windings in series opposition whereby the fundamental component of said alternating current signal present in said complex waves are canceled and whereby second harmonic of said alternating current signal present in said complex waves are added, a phase sensitive detector having a pair of input circuits and an output circuit, means for coupling a reference signal to one of said input circuits, said reference signal having a frequency corresponding to that of said second harmonics and a fixed phase relationship with respect to said alternating current signal, means for coupling the combined output of said series combination of secondary windings to the other input circuit of said phase detector, said detector producing in its output circuit a direct current voltage of a first or second polarity depending upon whether said reference signal is in phase or out of phase with the second harmonics present in said complex waves and means for energizing said feedback windings from said direct current voltage.

2. In a magnetic amplifier as described in claim 1 wherein said feedback windings are energized from said direct current voltage such that the flux produced in said cores by said feedback windings opposes the flux produced by said bias windings, said phase sensitive detector acting to maintain this condition of flux opposition despite changes in the polarity of the unidirectional signal energizing said bias windings.

3. In a magnetic amplifier of the type described in claim 2 resistive means connected in series with said feedback windings for coupling an output signal from said magnetic amplifier.

4. In a magnetic amplifier as defined in claim 2 wherein said alternating current signal and said reference signal are obtained from a common oscillator.

5. A magnetic amplifier comprising in combination a pair of magnetic cores, each core having wound thereon a primary, secondary, bias and compensating winding, means for applying to said primary windings a sinusoidal signal of a predetermined frequency, said signal having sufficient amplitude to cause saturation of said cores during a portion of its cycle whereby nonsinusoidal waves are induced in said secondary windings, means for energizing said bias windings with a unidirectional signal of variable amplitude and reversible polarity whereby said nonsinusoidal waves contain fundamental and second harmonic components of said sinusoidal signal, means for connecting said secondary windings in series opposition whereby said fundamental components of said sinusoidal signal are canceled and said second harmonic components are added, a phase sensitive detector having first and second input circuits and an output circuit, means for connecting a reference signal to said first input circuit, said reference signal being a second harmonic of said sinusoidal signal and having a fixed phase relationship with respect to said sinusoidal signal, means for connecting the series combination of secondary windings to the second input circuit of said phase sensitive detector, said detector operating to produce in its output circuit a direct current voltage of a first or second polarity depending upon whether said reference signal is in phase or out of phase with the second harmonics present in said nonsinusoidal waves and means for connecting said direct current voltage across said compensating windings to produce a current therein which generates a flux in opposition to the flux produced by said unidirectional signal in said bias windings and means for deriving an output voltage proportional to the current in said compensating windings.

6. A magnetic amplifier as defined in claim 5 wherein said means for deriving a voltage proportional to the current in said compensating windings comprises a resistor connected in series with said compensating windings.

References Cited in the file of this patent

UNITED STATES PATENTS

| | | |
|---|---|---|
| 1,739,579 | Dowling | Dec. 17, 1929 |
| 2,108,642 | Boardman | Feb. 15, 1938 |
| 2,164,383 | Burton | July 4, 1939 |
| 2,388,070 | Middel | Oct. 30, 1945 |
| 2,425,009 | Shepherd | Aug. 5, 1947 |
| 2,574,438 | Rossi et al. | Nov. 6, 1951 |
| 2,697,808 | MacNichol et al. | Dec. 21, 1954 |